United States Patent Office 2,887,478
Patented May 19, 1959

2,887,478

20-STEROID-TERTIARY CARBINOLS AND THE PREPARATION OF 17-KETO STEROIDS THEREFROM

Percy L. Julian and John W. Cole, Oak Park, and Edwin W. Meyer and William J. Karpel, Chicago, Ill., assignors, by mesne assignments, to Chas. Pfizer & Co., Inc., Brooklyn, N.Y., a corporation of Delaware No Drawing. Application November 12, 1952
Serial No. 320,118

14 Claims. (Cl. 260—239.55)

This invention relates to improvements in degrading 17-substituted steroids and more particularly it is concerned with the preparation of 17-keto steroids. The process of the present invention is especially useful for preparing 4-androsten-3,17-dione.

4-androsten-3,17-dione is a valuable intermediate useful for the preparation of testosterone and other male sex hormones. Its preparation by known methods, e.g., by the oxidation of cholesterol or the oxidation of dehydroepiandrosterone dibromide, followed by debromination, is subject to the disadvantages of low yield, expensive raw materials and/or difficultly obtainable starting materials.

16-dehydro-pregnenolone acetate, 5,16-pregnadien-3β-ol-20-one acetate, which is obtainable from the relatively abundant Mexican sapogenins, has now been found to be readily convertible to androstendione. This novel synthesis is indicated by the following general equations:

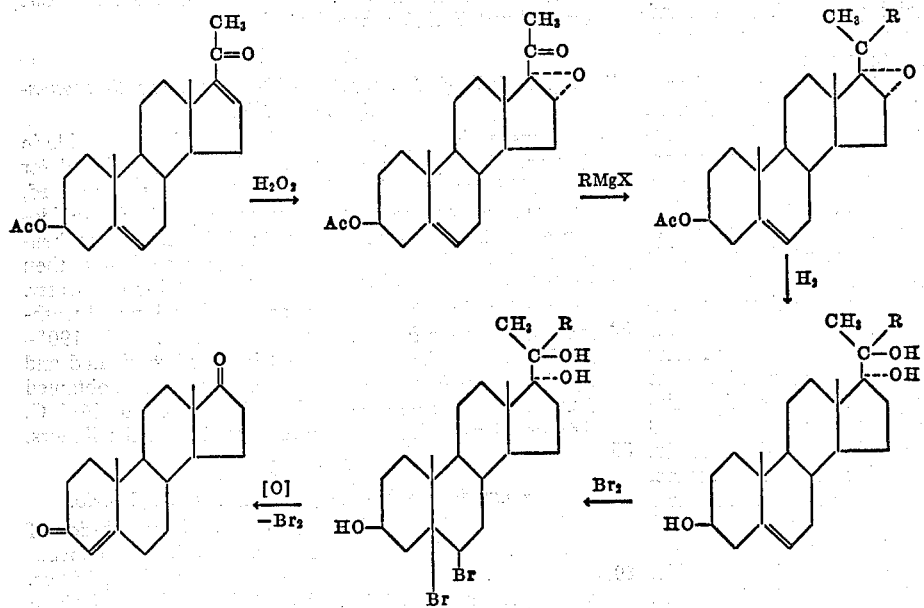

As starting materials in our novel synthesis of 17-keto steroids, we start with 16,17-oxido-20-keto steroids, preferably 17-acetyl steroids. These are conveniently prepared from the 17β-acetyl-Δ¹⁶ steroids by treatment with a per compound such as perbenzoic acid, hydrogen peroxide, etc. In cases where there is additional unsaturation in the nucleus, they may be prepared as disclosed in the Julian application Serial No. 165,120, filed May 29, 1950, now Patent No. 2,705,233. The presence of the oxido group in the 16,17-position has been found to activate, to a surprising degree, the 20-keto group, and thus makes possible the ready reaction thereof with Grignard reagents. Thereafter, as a second step, upon treatment of the tertiary carbinol with reducing agents of the type of lithium aluminum hydride, the 16,17-oxido group is converted in excellent yield to the 17α-hydroxy derivative. When starting with 16,17-oxido-5-pregnen-3-ol-20-one, the 3,17,20-triol in the third step, after protection of the 5,6-bond, is subjected to oxidation, and upon restoration of the double bond the desired 4-androsten-3,17-dione results. 4-androsten-3,17-dione can be converted to testosterone by known means, i.e., by the biochemical reduction procedure of Mamoli.

The following examples will illustrate the process of our invention:

EXAMPLE I

*Preparation of 20-methyl carbinol-oxido compound*

Methyl magnesium bromide was prepared in the usual manner from 0.36 g. of magnesium turnings, 2 g. of methyl bromide dissolved in about 5 cc. of dry benzene and 80 cc. of absolute ether. The Grignard reagent was cooled in an ice-salt mixture and to it was added rapidly, while vigorously agitating the mass, a solution of 1.8 g. of 16,17-oxido-5-pregnen-3β-ol-20-one acetate, prepared as described in copending application Serial No. 165,120, filed May 29, 1950, in 50 cc. of dry thiophene-free benzene. The resultant white crystalline slurry was agitated for ten minutes and then poured into a mixture of ice and 5% aqueous hydrochloric acid. The aqueous mixture was extracted with ether and the ether extract was washed with water. The wash ether solution, after being dried over anhydrous sodium sulfate, was evaporated to dryness. The white, crystalline residue was triturated with a mixture of absolute ether and hexane. Thusly 1.4 g. of the product 16,17-oxido-20-methyl-5-pregnen-3β-20-diol-3-acetate, melting at 159° to 162° C., was obtained. This was recrystallized from acetone and the purified product analyzed as follows.

Calculated for $C_{24}H_{36}O_4$: C, 74.72%; H, 9.54%.
Found: C, 74.18%; H, 9.34%.

EXAMPLE II

*Preparation of 16,17-oxido-20-methyl-pregnane-3α,20-diol-11-one-3-acetate*

In an analogous manner, 16,17-oxido-pregnan-3α-ol-11,20-dione acetate, prepared as disclosed in copending application Serial No. 165,120, filed May 29, 1950, upon treatment with slightly less than the theoretical amount of methyl magnesium bromide, produced 16,17-oxido-20- methyl-pregnane-3α,20-diol-11-one-3-acetate, melting at 196° to 197° C., from acetone.

*Analysis.*—Calculated for $C_{24}H_{34}O_5$: C, 71.42%; H, 9.14%. Found: C, 71.25%; H, 8.97%.

EXAMPLE III

*Preparation of 4-androsten-3,17-dione*

Methyl magnesium bromide was prepared in the usual manner from 19.4 g. of magnesium turnings, 90 g. of methyl bromide dissolved in benzene to a volume of 180 ml. and 625 ml. of absolute ether. The Grignard reagent was cooled in an ice-salt mixture to below 15° C. and to it was added a solution of 148.8 g. of 16,17-oxido-5-pregnen-3β-ol-20-one acetate in 1250 ml. of dry thiophene-free benzene. The addition was effected as rapidly as possible, about 4 minutes, holding the mixture below 20° C. The resultant grayish-white slurry was agitated for 15 minutes while cooling and thereafter it was decomposed by the cautious addition of 750 ml. of 10% aqueous hydrochloric acid. The resultant aqueous mixture was extracted with a mixture of benzene and alcohol-free ether. The extract was washed with dilute hydrochloric acid, water, aqueous sodium carbonate, and water and the washed extract was dried by distillation. The mass was made up to 1000 cc. by the addition of approximately 250 ml. of absolute ether and added during about 10 minutes to an agitated suspension of 30.5 g. of finely-divided lithium aluminum hydride in 1200 ml. of dry ether. The mixture, after about one-half hour at about 20° C., was heated to and maintained at a gentle reflux for 2½ hours. The cooled mass was decomposed by the cautious addition of 200 ml. of water added over about 45 minutes. To the white, granular slurry one liter of water was added and the solid separated by filtration. The filter cake was washed with water and then with ether. The washed cake then was reslurried in 2000 ml. of aqueous sulfuric acid, containing 100 ml. of 98% sulfuric acid, and the mixture filtered. The filter cake was washed acid-free with water and then dried.

The dried product, weighing 132 g., was ground to a fine powder and reslurried in water for ten minutes. The mixture was filtered, pressed "dry" and then dissolved in 1500 ml. of acetic acid by gentle warming. The solution was cooled to 18° C. and to it was added 72 g. of bromine dissolved in 500 ml. of acetic acid. The bromine color rapidly disappeared and the mass was cooled to 10° C. A solution of 150 g. of chromic oxide dissolved in 1000 ml. of 50% aqueous acetic acid was added in about 18 minutes, during which time the temperature of the mixture rose to 20° C. The mass was permitted to stand at about 25° C. for three hours, after which the excess chromic oxide was destroyed by the addition of about 50 ml. of methanol. The reaction mixture was agitated for about one-half hour and then 2000 ml. of 1 N aqueous chromous chloride was added slowly, keeping the mixture under a blanket of carbon dioxide. After being permitted to stand for three hours, the mass was concentrated in vacuo to a volume of about 1000 ml. The residue was diluted with water and then extracted with a mixture of ether and methylene-chloride. The extract was washed and then extracted with water, dilute aqueous hydrochloric acid, water, 10% aqueous caustic soda, and finally with water to neutrality. The washed extract was dried over anhydrous sodium sulfate and then evaporated to dryness. The crude residue was purified by recrystallization from acetone. The product melted at 167° to 170° C. A further quantity of the product, androstenedione, can be obtained from the mother liquor.

The total yield of 4-androsten-3,17-dione obtained in this manner from numerous preparations is in excess of 75% of the theoretical amount.

4-androsten-3,17-dione, prepared as described above, can be converted to the 3-enol ethyl ether by treatment with ethyl orthoformate in dioxane which, upon reduction with sodium borohydride, gives in excess of 75% of the theoretical amount of testosterone.

EXAMPLE IV

*Preparation of 20-methyl-5-pregnen-3β,17α,20-triol*

A suspension of 6 g. of lithium aluminum hydride was prepared by stirring and refluxing with 500 cc. of dry ether for 30 minutes. To this stirred mixture, at about 25° C., was added a solution of 20 g. of 16,17-oxido-20-methyl-5-pregnen-3β,20-diol-3 acetate in 200 cc. of benzene over about a five-minute period. The mixture was stirred for one-half hour and then refluxed for 2½ hours. After cooling in an ice bath, it was decomposed while stirring by the cautious addition of water and then dilute sulfuric acid. The slurry was filtered, the filter cake washed well with water and then dried. There was thus obtained 18.6 g. of 20-methyl-5-pregnen-3β,17α,20-triol, M.P. 195° to 200° C.

EXAMPLE V

*Preparation of 4-androsten-3,17-dione*

A solution of 3.48 g. of 20-methyl-5-pregnen-3β,17α,20-triol in 69 cc. of acetic acid and 3 cc. of water was treated with a solution of 1.65 g. of bromine in 10 cc. of acetic acid. After standing a few minutes, it was agitated for one hour and twenty minutes at 20° to 22° with a solution of 4.5 g. chromic oxide in 20 cc. of a 50% solution of acetic acid. The excess chromic acid was destroyed by the addition of a mixture of 2 cc. methanol and 2 cc. of 50% sulfuric acid, after which the mixture was dehalogenated with 55 cc. of one molar chromous chloride solution upon standing overnight. The mixture was diluted with water and extracted several times with ether. The ether extracts were washed with water, 10% sodium hydroxide, and finally with water to neutrality. The solution was dried and concentrated to low volume, whereupon 2.28 g., M.P. 169°–172° of androstendione crystallized, 79.7% theoretical yield.

EXAMPLE VI

*Preparation of 4-androsten-3,17-dione from 5-pregnen-3β,17α,20-triol*

A suspension of 6.5 g. of lithium aluminum hydride in 200 cc. of anhydrous ether was stirred and refluxed for one-half hour. To this stirred solution there was added, at room temperature, a solution of 25 g. of 16,17-oxido-5-pregnen-3β-ol-20-one acetate in 200 cc. of dry benzene. The mixture was refluxed for four hours, then cooled and decomposed by the careful addition of water, and finally dilute hydrochloric acid. Filtration and washing with water afforded, after drying, 21 g., M.P. 190°–210° of the 3,17,20-triol. The triol was brominated and oxidized as in Example V, whereupon there was obtained 12.6 g. of crude androstenedione, M.P. 165° to 169° C. Additional material could be recovered from the liquors.

EXAMPLE VII

*Preparation of 20-methyl-5-pregnen-3,17,20-triol*

To a cold, 10° to 12° C., vigorously-stirred solution of methyl magnesium bromide (prepared in the conventional manner from 20 g. of magnesium turnings, 750 cc. of anhydrous ether, 90 g. of methyl bromide and about 90 cc. of thiophene-free benzene) was added, during about 10 minutes, 150 g. of 16,17-oxido-pregnenolone acetate in 1500 cc. of thiophene-free benzene. The resulting mixture was agitated at 12° to 20° C. for about 40 minutes, and thereafter 42 g. of lithium aluminum hydride in 1200 cc. of anhydrous ether was added as rapidly as possible. This mixture was refluxed gently for about 20 hours and then, after being cooled, the mass was decomposed by the dropwise addition of water. The mixture was rendered acid by the addition of 1000 cc. of 6 N hydrochloric acid, and the mass was agitated for one hour. The resultant slurry was filtered and the filter-cake was washed once with 6 N acid, 3 times with water, once with 2% aqueous sodium acetate, 3 times again with water, and finally with petroleum ether. The washed triol was dried at 50° to 60° and melted between 195° and 205° C.

This product can be converted to androstendione as indicated in Example V.

As can be readily seen from the above examples, a method has been provided to convert 16,17-oxido-pregnanes to 17-keto-androstanes, and particularly to convert 16,17-oxido-pregnenolone to 4-androsten-3,17-dione, from which testosterone and methyl testosterone can be obtained with relative ease. Our invention also provides a novel process for the preparation of 20-tertiary carbinols of the pregnane series. Our invention, however, is not limited to the particular compounds illustrated, but can be applied to 16,17-oxido-17-acetyl steroids in general. For example, from the 20-carbinol of Example II, 5α-androstan-3,11,17-trione can be obtained. 16,17-oxido-5-pregnen-3β-ol-12,20-dione acetate yields 4-androsten-3,12,17-trione. 16,17-oxido-allo-pregnan-3β-ol-20-one acetate yields androstan-3,17-dione.

Variations in the procedure other than those suggested in the examples are contemplated also. For example, any alkyl, aryl or aralkyl Grignard reagent can be used, and it can be either a bromide, chloride or iodide. It is also contemplated that other 20-keto compounds than the methyl ketones be used. For example, the 20-keto compounds of U.S. Patent No. 2,342,147 may be used. Where the tertiary carbinol is to be isolated and a single product is desired, the Grignard chosen should be one which possesses the same hydrocarbon radical as that attached to the 20-carbon atom in order to avoid asymmetry at C-20 in the resulting carbinol. Thus when treating a compound of the pregnane series, a methyl Grignard may be preferred.

The 5,6-double bond, when present, can be protected during the oxidation step by means other than bromination. For example, the 3-acyloxy group can be converted by known means to the i-ether. After the oxidation, the 3-hydroxy group can be restored, and if desired, oxidized by known procedures, for example, the Oppenauer procedure, to the 3-ketone.

Agents other than chromic oxide can be used to effect the oxidation of the dihydroxy side chain. Such agents as periodic acid, lead tetraacetate, and alkaline potassium permanganate are effective alternatives. Also, esters other than the acetate, such as the benzoate, naphthoate, formate, nicotinate, and also other 3-oxygenated derivatives such as the 3-alkoxy (methoxy, butoxy, phenoxy, etc.) can be employed in this process.

We have found the free 3-hydroxy derivatives of the Grignard reaction product, i.e., the oxido-3,20-diols, to be relatively insoluble in ether-benzene reaction media. This insoluble material results in exceedingly slow reaction. Accordingly, when it is intended to effect the reduction of the oxido-diols to the corresponding triols in such media, the 3-hydroxy derivatives should preferably be avoided. The 3-acyloxy derivatives are preferred, not only because they are readily obtainable, but also because of their greater solubility in the reaction media used in the subsequent steps.

For this reason also, large excesses of Grignard reagent should be avoided due to the possibility of the large excess of said reagent effecting hydrolysis of the 3-acyloxy group to form the insoluble free 3-hydroxy group. As has been stated above, the presence of the 16,17-oxido substituent increases to a surprising degree the reactivity of the 20-keto group with Grignard reagents. Accordingly, large excesses of the Grignard reagent are seldom required to obtain substantially complete reaction, and, therefore, such excesses are preferably avoided. We have found that a molar excess over the stoichiometric requirement is generally sufficient to effect complete reaction. We especially prefer to use at least 80%, and not more than 100% excess, of the theoretical amount required.

Any reducing agent of the metal hydride type can be used to convert the 16,17-oxido group to 17α-hydroxy. Sodium aluminum hydride and sodium borohydride have been found to be effective, although the former, because of its lesser solubility in the usual reaction solvents, and the latter, because of its lesser rate of reaction, compared to lithium aluminum hydride, are less desirable than lithium aluminum hydride.

Having described the invention, what is claimed is:

1. The process which comprises treating a 16,17-oxido 20 - methyl - 20 - keto - 10,13 - dimethyl-cyclopentanopolyhydrophenanthrene steroid possessing an oxygenated substituent in the 3-position selected from the class consisting of a hydroxy group and an acyloxy group of a lower hydrocarbon carboxylic acid with a Grignard reagent, then treating with a reducing agent selected from the class of bimetal hydrides, and then treating with an oxidizing agent selected from the class consisting of chromic acid, periodic acid, lead tetraacetate and alkaline permanganate to form a 17-keto steroid.

2. The process of claim 1 in which the starting steroid is a steroid of the pregnane series.

3. The process of claim 2 in which the starting steroid is a 16,17-oxido-5-pregnene-3-ol-20-one acetate.

4. The process of producing androstenedione which comprises treating 16,17-oxido-5-pregnene-3β-ol-20-one acetate with a Grignard reagent, then treating with a reducing agent selected from the class consisting of bimetal hydrides, then hydrolyzing to form a 3-OH group, and thereafter treating with chromic oxide with intermediate protection of the double bond to form androstendione.

5. The process of claim 4 in which the Grignard reagent is methyl magnesium bromide and the reducing agent is lithium aluminum hydride.

6. 16,17 - oxido - 20 - methyl - 5 - pregnene - 3β,20-diol-3 acetate.

7. 16,17 - oxido - 20 - methyl - pregnane - 3α,20 - diol-11-one-3 acetate.

8. The process which comprises converting a 16,17-oxido - 20 - methyl - 20 - keto - 10,13 - dimethyl - cyclopentanopolyhydrophenanthrene steroid possessing an oxygenated substituent in the 3-position selected from the group consisting of hydroxy, alkoxy and an acyloxy group of a lower hydrocarbon carboxylic acid to the corresponding 20-hydroxy-20-alkyl analogue by treatment with a Grignard reagent, and reducing the 16,17-oxido group of the thus-formed 20-hydroxy compound to a 17α-hydroxy group by treatment with a bimetal hydride.

9. The process of claim 8 in which the starting steroid is a compound of the pregnane series.

10. The process of claim 8 in which the starting steroid is 16,17-oxido-5-pregnene-3β-ol-20-one acetate.

11. The process of claim 8 in which the bimetal hydride is a hydride of an alkali metal and a trivalent metal selected from the class consisting of aluminum and boron.

12. The process of claim 11 in which the Grignard reagent is a methyl magnesium halide.

13. The process of claim 1 in which the bimetal hydride is a hydride of an alkali metal and a metal selected from the class consisting of aluminum and boron.

14. Compounds of the following general formula:

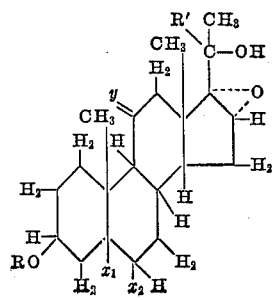

in which R is selected from the group consisting of hydrogen, an alkyl group and an acyl group of a lower hydrocarbon carboxylic acid, $x_1$ and $x_2$ are selected from the group consisting of two hydrogens and a carbon-carbon bond, $y$ is selected from the class consisting of =O and

and R' is a lower hydrocarbon radical.

References Cited in the file of this patent

UNITED STATES PATENTS

| | | |
|---|---|---|
| 2,184,299 | Hildebrant | Dec. 26, 1939 |
| 2,265,143 | Butenandt | Dec. 9, 1941 |
| 2,508,471 | Sarett | May 23, 1950 |
| 2,516,259 | Sarett | July 25, 1950 |
| 2,599,481 | Plattner | June 3, 1952 |
| 2,662,904 | Julian et al. | Dec. 15, 1953 |

OTHER REFERENCES

Kohler: J. Am. Chem. Soc., vol. 57, pages 1099–1101 (1935).

Marker et al.: J. Am. Chem. Soc, vol. 64, pages 1276–80 (1942).

UNITED STATES PATENT OFFICE
Certificate of Correction

Patent No. 2,887,478                                                        May 19, 1959

Percy L. Julian et al.

It is hereby certified that error appears in the printed specification of the above numbered patent requiring correction and that the said Letters Patent should read as corrected below.

Column 2, the first structural formula should appear as shown below instead of as in the patent:

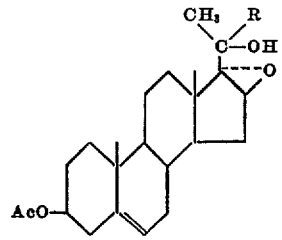

Signed and sealed this 20th day of October 1959.

[SEAL]

Attest:
KARL H. AXLINE,
Attesting Officer.

ROBERT C. WATSON,
Commissioner of Patents.